W. M. BERING & J. N. J. HILBERT.
HAY RAKE FRAME.
APPLICATION FILED FEB. 27, 1911.
1,034,957.
Patented Aug. 6, 1912.
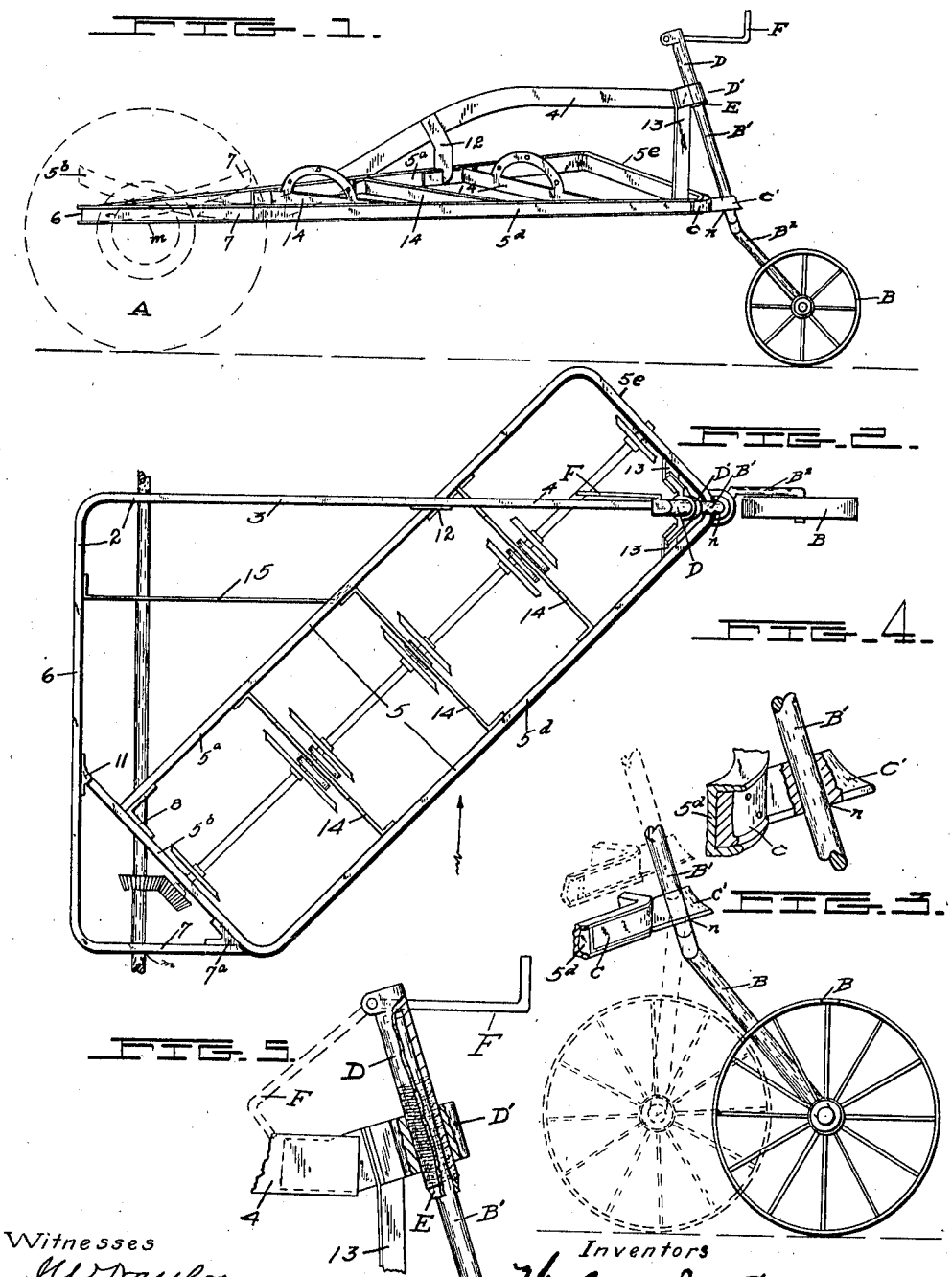
Witnesses
Inventors

UNITED STATES PATENT OFFICE.

WILSON M. BERING, OF DECATUR, AND JOHN N. J. HILBERT, OF CHICAGO, ILLINOIS.

HAY-RAKE FRAME.

1,034,957.  Specification of Letters Patent.  Patented Aug. 6, 1912.

Application filed February 27, 1911. Serial No. 611,131.

*To all whom it may concern:*

Be it known that we, WILSON M. BERING and JOHN N. J. HILBERT, citizens of the United States, residing WILSON M. BERING at Decatur, in the county of Macon and State of Illinois, and JOHN N. J. HILBERT at Chicago, Cook county, Illinois, have invented certain new and useful Improvements in Hay-Rack Frames, of which the following is a specification.

Our invention relates to supporting frames for side delivery hay rakes and the like.

The object of our invention is to produce a self-poised frame, the parts thereof to be disposed in a relation to induce a spring tension upon the more or less extended reaches or connecting frame parts for the purpose of preventing sagging and to produce rigidity as distinguished from the natural flexibility of extended frame parts not held under spring tension.

Our invention consists in the arrangement and formation of the frame parts to produce a carrying frame for a hay rake to best facilitate the proper carrying of the rake parts, the driving mechanism therefor, and other attending essential detail parts, and our invention further consists in so forming the frame parts that in uniting them to attain the desired normal adjustment, a spring tension will be induced therein at the proper points to produce rigidity and to make such parts essentially self-sustaining.

Our invention further consists in means for raising and lowering the frame upon its wheel supports and to the disposition of the caster wheel with relation to the frame to facilitate an automatic lifting thereof in the rearward movement of the same.

Referring to the drawings, Figure 1 is a side elevation looking in the direction indicated by the arrow; Fig. 2 is a plan view of the frame and the caster wheel and also shows fragmentary parts of a rake cylinder in diagrammatic relation with only sufficient fullness to indicate the uses to which the frame is designed to be put; Fig. 3 is a side elevation of the caster wheel showing the manner of mounting the same in connection with a frame part. The figure also shows in dotted lines the raising and lowering effect resulting from the turning of the caster wheel about its axis of support; Fig. 4 is a detail view showing the manner of connecting parts between the frame and the caster wheel stem; and Fig. 5 is a detail view of a screw-thread raising means connecting the frame and the caster wheel spindle.

In carrying out our invention as applied to side delivery rakes, we provide what we will designate for convenience the main frame 2 which is formed of a single piece of channel iron bent into the general rectangular shape shown in Fig. 1, the portions of the frame referred to as 3, 6 and 7 lying normally in approximately the same horizontal plane, but the portion 4 thereof is bent upwardly and extended rearwardly in the manner shown in Fig. 2 and will be referred to as the girder. In forming frame 2, the portion 7 thereof is bent upwardly into the position shown in dotted lines in Fig. 1.

5 refers generally to the rake cylinder frame and is preferably formed of a single piece of angle iron bent into the shape shown in the figure and disposed as illustrated, angularly with relation to the main frame 2. In forming frame 5, the end reach or frame part indicated as $5^b$ is bent upwardly as shown in dotted lines in Fig. 1.

Frames 2 and 5 having been disposed relatively at the angle disclosed in Fig. 2, the end frame portion $5^b$ is sprung downwardly until its upper edge is flush with the upper edge of longitudinal frame piece $5^a$ of frame 5, and the two frame pieces are united by bracket 8. The outer end of frame $5^b$ is united to the forward frame part 6 of frame 2 by means of bracket 11. In uniting frames 2 and 5, reach 7 of frame 2 is sprung downwardly until its outer end is flush with the upper edge of said frame 5 and is then secured to said frame by means of bracket $7^a$ as shown in Fig. 2. The effect of springing downwardly the end of frame piece $5^b$ and securely holding it in connection with frame parts 6 and $5^a$ is to induce an upward strain upon the rearward left hand portion of frame 5 as communicated particularly to the extended frame part $5^d$. Likewise, the spring downwardly of frame part 7 of frame 2 and connecting it with the rearward extremity of side frame piece $5^b$ also produces an upward strain upon the rearward left hand corner of frame 5. The purpose of inducing such an upward strain is to carry the weight of the long stretch between the support of the frame upon the axle at $m$ and the support of the frame upon the spindle of the caster wheel as at *n*. As a result of the upward strain of frame parts 5ᵇ and 7, the rear portion of frame 5 is held from sagging.

Frame 5 is united to frame 2 by means of the standard or bar 13 connecting the outer end of girder 4 with frame part 5ᵈ of frame 5 and by means of the bracket 12 which unites said girder 4 to the forward frame part 5ᵃ of frame 5.

Frame 5 is supported in connection with girder 4 under a spring tension induced by the upward flexing of the upward right hand portion 5ᶜ of frame 5 and is secured in such flexed position by means of the bracket 12 as shown in Fig. 2. This flexing of the frame induces rigidity of the frame parts and obviates any sagging tendency, besides which, the elevation of the forward right hand corner of frame 5 produces additional clearance, which is desirable at the delivery portion of the rake frame.

Brace rods as 14 may be provided between reaches 5ᵃ and 5ᵈ of cylinder frame 5 and a brace as 15 may be provided between frame 5 and the forward reach 6 of frame 2 or the frame may be in any manner suitably braced to meet the requirements of use, but generally the springing and flexing strain induced in the uniting of the parts is sufficient to produce an adequate rigidity of the frame to obviate the necessity of any extensive bracing of the parts.

As a part of the carrying frame, we have provided the ordinary front wheels, as shown at A in dotted lines. We have also provided a caster wheel designed functionally to attain certain objects, and referring to this portion of the structure, we have provided the ordinary wheel as B, the spindle B′ and the bent arm B², which parts are relatively in the same form as ordinarily used. However, we have planned to dispose the spindle B′ angularly with reference to the vertical sides of the frame adapted to be supported thereon, as distinguished from the vertical bearing of the spindle as ordinarily applied. The application and effect of this angular disposition of the spindle relative to the frame may be seen by reference to Fig. 3, in which C indicates a bracket adapted to connect with the frame provided with a lug extension C′ angularly disposed and provided with a perforation conforming to the direction of bearing desired for spindle B′. It will be observed that as the machine progresses or moves forwardly in the field, the wheel B will trail in the manner shown in solid lines. If the machine is turned, wheel B will incline angularly with relation to the frame, and if the machine is moved rearwardly, it will turn one-half revolution of the spindle B′ and will occupy the position shown in dotted lines. The movement from the direct trailing line to the maximum rearward position shown in dotted lines, occupied when the machine is moving in an exact opposite direction, will effect a gradual raising of the frame until the maximum position shown in dotted lines, of connecting bracket C will be attained, thus producing greater clearance for the rake cylinder.

We have designed a special means for raising the frame, which means is shown in Fig. 5 and is applied to spindle B′ at the upper portion thereof. This means consists merely of a threaded sleeve D carried over the top of the spindle and resting upon collar E fixed on said spindle. The exterior threads of the cap engage similar threads in lug extension D′ connected with girder 4. We have provided a handle or lever as F by means of which the sleeve may be turned. This handle or lever may be pivoted to the sleeve as shown, so that it may be shifted into the position shown in dotted lines when not in use in order to form a stop to prevent the sleeve from turning except for a limited distance. The construction is so obviously simple that further detail description is deemed unnecessary.

While we have shown the application for use of the general frame structure to a side delivery cylinder rake, it may as well be applied to a tedder frame and to like frames adapted for the same general use, and therefore do not desire to confine ourselves to the particular application described herein and disclosed in the drawings.

What we claim and desire to secure by Letters Patent of the United States is:

1. In a hay rake, a horizontally disposed main frame portion formed of a single piece of metal and having a portion extended rearwardly and bent upwardly diagonally and then downwardly and rearwardly, a rake carrying frame disposed diagonally with relation to the main frame and formed of a single piece of metal, the forward portion of said last mentioned frame being bent upwardly, gradually increasing from side to side to the delivery end of the rake, and hanger and brace connections between the front and rear portions of the rake carrying frame and the upwardly carried and rearwardly extended portion of the main frame.

2. In a hay rake traction wheels, a main frame portion suitably supported thereon and formed of a single piece of channel iron, and having a portion of a rearwardly extending reach thereof bent upwardly, extended rearwardly and connected with the traction support at the rear of the frame, a rake carrying frame disposed diagonally with relation to the main frame, formed of a single piece of channel iron having its forward portion bent gradually upwardly to the right hand corner of the frame to provide a raking clearance gradually increasing from end to end of the frame and having hanger and brace connections between the front and rear portions of the rake frame and the upwardly carried portion of the main frame.

3. A hay rake frame comprising a main frame formed of a single piece of channel iron comprising a transverse reach, a short rearwardly extending reach bent upwardly from the plane occupied by the transverse reach, a long reach extending rearwardly, a portion of its length then bent upwardly and then back to a plane substantially parallel with the plane of the first named portion, a rectangular rake carrying frame disposed diagonally in the main frame and formed of a single piece of channel iron with the left end portion of said frame joined to the free end of the front side portion thereof and extending beyond it and joined to the main frame and having the rear corner of the advanced end of the frame connected with a short arm of the main frame under the spring tension of said short arm and having the forward right corner portion bent upwardly, and connections between the rearwardly extending portion of the long reach of the main frame and the front and rear portions of the rake carrying frame to support the latter frame from the former and to hold it in shape.

In testimony whereof we have affixed our signatures in presence of two witnesses.

WILSON M. BERING.
JOHN N. J. HILBERT.

Witnesses:
J. FRANK DAVIS,
A. M. WIDICK.

---

Copies of this patent may be obtained for five cents each, by addressing the "Commissioner of Patents, Washington, D. C."